L. P. HALLADAY.
AUTOMOBILE BUMPER.
APPLICATION FILED MAR. 24, 1913.
1,106,558.
Patented Aug. 11, 1914.
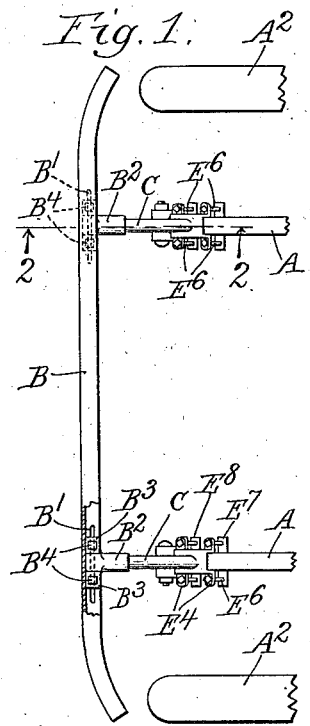
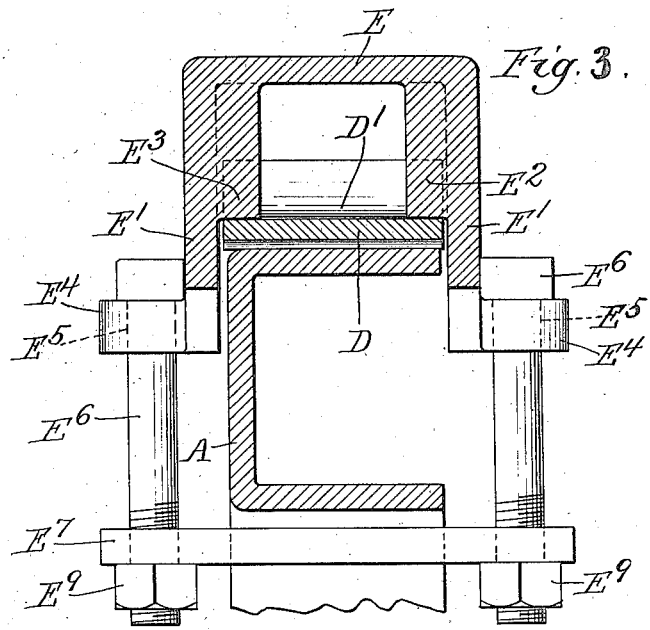
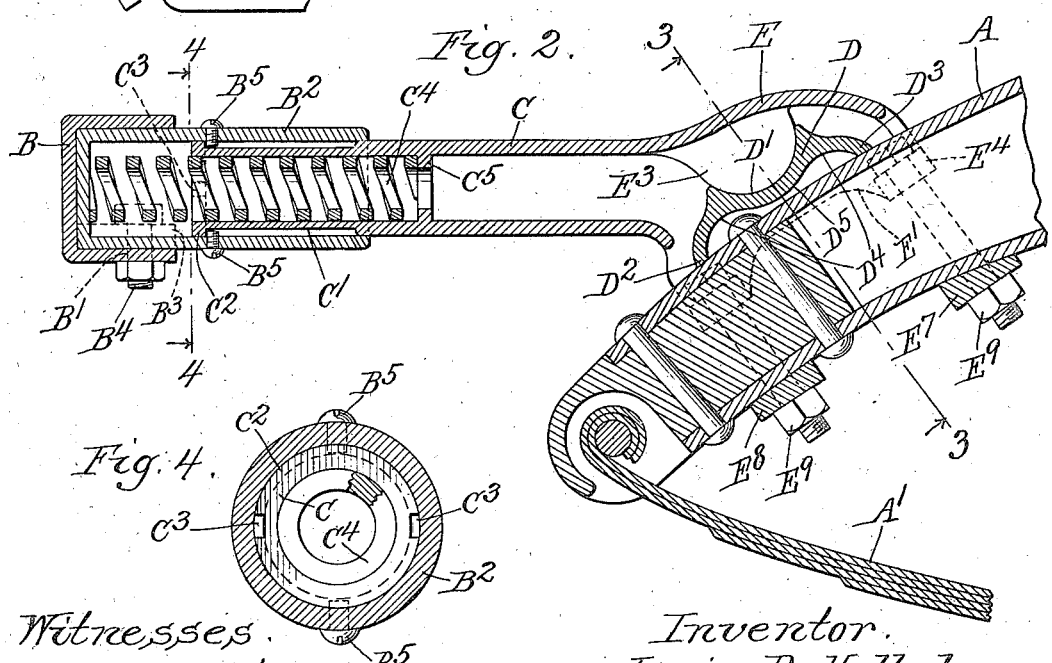
Witnesses.
Edward T. Wray.
Minnie M. Lindman
Inventor.
Lewis P. Halladay.
by Parker & Carter
Attorneys.

UNITED STATES PATENT OFFICE.

LEWIS P. HALLADAY, OF STREATOR, ILLINOIS.

AUTOMOBILE-BUMPER.

1,106,558.	Specification of Letters Patent.	Patented Aug. 11, 1914.

Application filed March 24, 1913. Serial No. 756,324.

*To all whom it may concern:*

Be it known that I, LEWIS P. HALLADAY, a citizen of the United States, residing at Streator, in the county of La Salle and State of Illinois, have invented a certain new and useful Improvement in Automobile-Bumpers, of which the following is a specification.

My invention relates to improvements in automobile bumpers.

It is illustrated diagrammatically in one form in the accompanying drawing, wherein—

Figure 1 is a plan view of the front end of an automobile frame with parts in section and parts broken away; Fig. 2 is a section on an enlarged scale along line 2—2 of Fig. 1; Fig. 3 is a section along line 3—3 of Fig. 2; and Fig. 4 is a section along line 4—4 of Fig. 2.

For the purpose of more clearly and easily illustrating my invention I have shown it applied to the front horns or ends A, A of an ordinary automobile frame, the remainder of which is not shown, which is supported upon springs $A^1$ and wheels $A^2$.

The channel B forms the usual bumper or guard across the front of the frame of the automobile and is slotted along its lower flange as indicated at $B^1$. The thimble $B^2$ is provided with laterally disposed ears $B^3$ which may be bolted to the channel by the bolts $B^4$ in the slots $B^1$ as indicated to hold the thimble and guard in fixed position with respect one to the other. It will be noted that the thimble $B^2$ is open only at its rear end and is preferably although not necessarily rounded off except where it is in contact with the bumper and there it must have two parallel sides at right angles to the square end to give a firm contact with the bumper. The interior of the thimble back of the bumper may be circular in cross section. Pins $B^5$ are screw-threaded in the thimble $B^2$ and project slightly thereinto separated by an angle of 180°.

The thimble $B^2$ is mounted on the bracket C which bracket is substantially tubular and provided with a reduced area $C^1$ adjacent its forward end terminating in a projecting collar $C^2$ which collar is slotted as at $C^3$, $C^3$, these slots being so disposed with respect to the pins $B^5$ that when the bracket and collar are in the assembled position the pins are located at a distance of 90° from the slots, thus providing for assembling by rotating the thimble with respect to the bracket, slipping the pins through the slots and then rotating the bracket and thimble to bring the slots and pins out of alinement, thus holding the thimble in position limited as it is in its forward movement with respect to the bracket by the pins. The spring $C^4$ is inclosed within the thimble at the end of the bracket, abutting at one end on the collar $C^5$ in the bracket and at the other end on the front or bottom end of the thimble $B^2$.

A saddle D having on its upper surface a truncated, cylindrical trough or bearing surface $D^1$ rests upon the upper surface of the frame horn, being in contact therewith along a line at either end as indicated at $D^2$, $D^3$ and out of contact at all other points. This saddle is, for the purpose of convenience and lightness and also to permit it to assume its position independent of the presence of rivet heads in the frame, upwardly curved as indicated at $D^4$ on both sides of the trough portion and downwardly curved as indicated at $D^5$ below the trough portion, thus making in effect two pockets between the saddle and the frame either one of which might contain the rivet head.

The bracket C terminates in an enlarged head or yoke E channel-shaped and provided with the downwardly depending sides $E^1$, $E^1$ on either side of the saddle. The lugs $E^2$, $E^3$ downwardly depending on the inside of the channel are provided with curved bearing surfaces in engagement with either end of the trough or bearing in the saddle D. The ears $E^4$, $E^4$ projecting outwardly from either end of the walls $E^1$, $E^1$ are perforated as indicated at $E^5$ to engage the bolts $E^6$. Cross pieces $E^7$, $E^8$ engage the lower sides of the frame horn, and, when the nuts $E^9$ are tightened up on the bolts $E^6$, assist in holding the bracket and the saddle in fixed relation, thus holding the bumper in position. It will be noted that the curved bearing surface of the bumper on the saddle together with the two sets of bolts attaching it in position permit a certain degree of adjustment of the bumper so that it may be made to assume a horizontal position independent of the curvature of the forward horns. The pressure of impact on the bumper it will be noted will be thus carried at a point removed from the end of the frame. The pressure of the bolts and holding means tends to make the saddle bite into the frame to a certain extent to prevent displacement. Moreover, since the horns of automobile frames normally increase in depth from the end rearwardly, there is no dangerous tendency toward rearward movement of the bumper.

By carrying the bumper away from the end of the horn where the horn is thicker and where the curvature is likely to be slightly less, it will be noted that the tendency to bend the frame when heavy blows are given to the bumper is thereby greatly minimized, and one great disadvantage in the well known type of bumper where the load is applied to the end of the frame is thus obviated.

It will be evident that, while I have shown in my drawing an operative device, still many changes might be made in size, shape and arrangement of parts without departing materially from the spirit of my invention. I wish, therefore, that my drawing be regarded as in a sense diagrammatic.

I claim:

1. In an automobile bumper a tubular bracket, a thimble slidably mounted on the bracket, a bumper member carried by the thimble and a compressible member located within the thimble and the bracket abutting at one end on the thimble and at the other end on the bracket, said bracket being reduced beneath the thimble and provided with a slotted collar about its forward end and pins carried by the thimble and adapted to abut upon the collar.

2. In an automobile bumper a tubular bracket, a thimble slidably mounted on the bracket, a bumper member carried by the thimble and a compressible member located within the thimble and the bracket abutting at one end on the thimble and at the other end on the bracket, said bracket being reduced beneath the thimble and provided with a slotted collar about its forward end and pins carried by the thimble and adapted to abut upon the collar, the relative positions of said pins and slots being such that when in the assembled relation the pins are out of line with the slots.

3. In an automobile bumper a saddle having a cylindrical bearing thereon and resting upon the automobile frame, a bumper bracket, a pair of lugs downwardly projecting from the bumper bracket on either side and provided with cylindrical surfaces in engagement with said cylindrical bearing and means for holding said saddle and said bracket together in fixed position on the automobile frame.

4. In an automobile bumper, a cradle resting upon the automobile frame, a bumper bracket rotatable with respect to and resting upon the cradle, and means in engagement with the bracket and adjacent and out of contact with the cradle for holding the bumper bracket and cradle in fixed position with respect each to the other and each to the frame.

5. In an automobile bumper, a cradle free to rest upon the automobile frame, a segmental, cylindrical bearing on said cradle, a bumper bracket and a segmental, cylindrical projection thereon engaging said bearing on said cradle and means adjacent and out of contact with said cradle for holding said bracket in fixed relation to said cradle and bearing and to the automobile frame.

6. An automobile bumper comprising a cradle resting upon the automobile frame with bearing surface thereon, a bumper bracket engaging said bearing surface, a yoke on said bracket inclosing and covering said cradle and means for holding said yoke in fixed position with respect to the frame independent of said cradle.

In testimony whereof, I affix my signature in the presence of two witnesses this twelfth day of March 1913.

LEWIS P. HALLADAY.

Witnesses:
M. COULSON,
T. S. BERTIAUX,